Aug. 8, 1939.    J. E. SYMONS ET AL    2,168,371

BRAKE

Filed Jan. 4, 1938

James E. Symons
Jesse W. Symons
INVENTOR

BY Victor J. Evans & Co.
ATTORNEYS

Patented Aug. 8, 1939

2,168,371

UNITED STATES PATENT OFFICE 2,168,371

BRAKE

James E. Symons and Jesse W. Symons, Monessen, Pa.

Application January 4, 1938, Serial No. 183,365

2 Claims. (Cl. 188—72)

This invention relates to vehicle wheel brakes, and its general object is to provide a brake of the disk type, in which worm or screw means are employed for effecting the braking action through the medium of a thrust bearing, therefore the pressure will be equal throughout the braking faces of the disks, which will result in positive and smooth operation, as well as uniform wear of the faces for the entire life thereof.

A further object is to provide a vehicle brake of the character set forth, that is capable of operation with equal efficiency on either the front or rear wheels, can be easily adjusted, but will perform a positive braking action for a prolonged period of time without adjustment or attention.

Another object is to provide a vehicle wheel brake that is simple in construction, inexpensive to manufacture, easy to install, and is extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
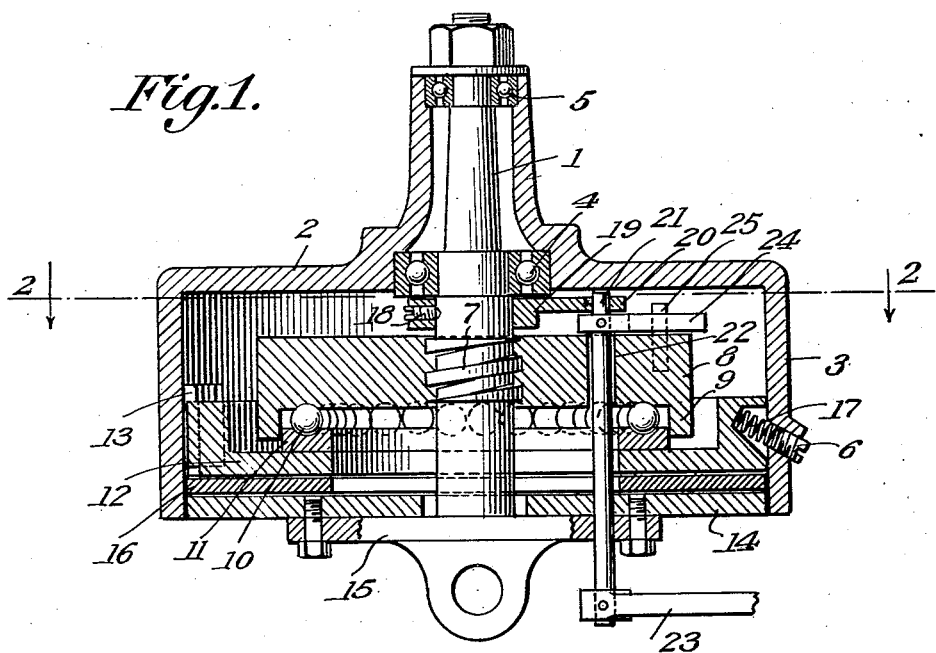
Figure 1 is a transverse sectional view taken through the brake which forms the subject matter of the present invention and illustrates the same applied to a spindle of the front axle of a vehicle.

Referring to the drawing in detail, it will be noted that the brake which forms the subject matter of the present invention is illustrated as being installed on the spindle of a front axle of a vehicle, but the brake can be installed on and with respect to the rear axle housing of the vehicle for application to the rear wheels thereof.

In the drawing, the numeral 1 indicates the spindle, 2 the wheel hub and 3 the drum which is formed integral with the hub, in the form as shown, and at the juncture of the hub with the drum, the hub is provided with an annular recess within which are mounted bearings 4. Bearings 5 are provided at the outer end of the hub for cooperation with the bearings 4, in rotatably mounting the hub and drum on the spindle.

The portion of the spindle within the drum is threaded as at 7 to provide a worm, and mounted on the threaded portion is the disk-shaped body 8 of a thrust bearing, the body being interiorly threaded to receive the threads 7 of the spindle as clearly shown in Figure 1. The body 8 is flanged as at 9 and an annular groove is arranged in the flanged face of the body and inwardly of the flange thereof to receive the balls 10 of the thrust bearing, the balls being likewise mounted in the annular groove in the ring 11 of the bearing, and the grooves provide a race for the balls, as will be apparent.

Figure 2:
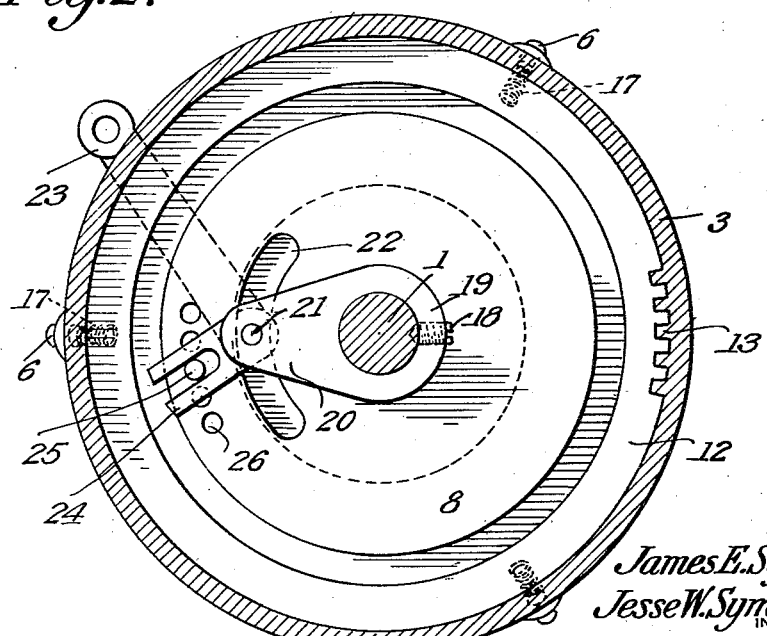
Figure 2 is a sectional view taken approximately on line 2—2 of Figure 1.

The ring 11 is held associated with respect to the body, by the flange 9 and is disposed in engagement with a disk pressure plate 12 that has its inner face recessed to receive the ring 11 and the flange of the body, as shown in Figure 1. The disk pressure plate 12 is splined or keyed to the circumferential wall of the drum, preferably by a plurality of keys 13 that are fitted in grooves or key ways in the periphery of the plate, as best shown in Figure 2. By that structure, it will be obvious that the plate 12 is carried by the drum for rotation therewith but is freely movable axially therein, for cooperation with a stationary disk plate 14 which is shown as being bolted to the spindle flange 15. Suitable lining 16 is mounted for movement or to float between the disk plate 14 and the pressure plate 12, and it will be noted that the plate 14 closes the open inner end of the drum which in fact provides a housing for the brake parts, as will be apparent upon inspection of Figure 1. The plate 12 is normally held spaced with respect to the lining by coil springs 17 which are mounted in pockets in the periphery of the plate 12, that register with openings in the drum 3, and threaded in the openings are kerfed screws 6 engaged with the springs for holding and adjusting the springs against the plate, as best shown in Figure 1.

Secured to the spindle, by a set screw 18, is a collar 19 which has formed thereon an extension 20 provided with an opening therein and within which is mounted one end of a shaft 21 that extends through an arcuate shaped slot 22 in the body 8, as well as through openings in the plate 12, the plate 14 and the flange 15. The outer end of the shaft 21 has secured thereto a lever 23 which is adapted to have suitable means connected thereto, for operating the brake through the medium of any suitable mechanical or hydraulic means, as will be apparent.

Fixed to the shaft between the extension of the collar 18 and the body 8 is a fork 24, and threadedly mounted in the body 8 for disposal between the arms of the fork is a pin 25 which may be mounted in any one of a number of openings 26 in the body, in order to bring about an adjustment of the brake as will be apparent.

From the above description and disclosure of the drawing, it will be obvious that the brake is applied through the instrumentality of the shaft 21 and when the shaft is rocked in one direction, the arms of the fork 24 will engage the pin to cause rotation of the body 8 of the thrust bearing on the threads 7 of the spindle 1. Such action will result in the plate 12 being disposed in binding engagement with the lining 16, in that pressure is applied to the plate 12 through the instrumentality of the thrust bearing, as will be apparent upon inspection of Figure 1.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A vehicle wheel brake comprising a drum providing a housing having an open end, a hub formed on the drum, a stationary disk plate closing the open end, a pressure plate keyed in the drum for movement toward and away from the stationary plate for cooperation therewith, friction lining mounted to float between the plates, said pressure plate having radially disposed pockets extending at an inclination in the periphery thereof, springs mounted in the pockets, to urge and hold the pressure plate in normal position away from the stationary plate, fixed screw means mounted in the drum, a thrust bearing including a flanged body threaded on the screw means, a ring slidably mounted in the flanged portion of the body, anti-friction balls between the body and ring and the latter being engaged with the pressure plate, and means for threading the body on the screw means for urging the ring against the pressure plate to move the latter to operative position 2. A vehicle wheel brake comprising a drum providing a housing having an open end, a stationary plate closing the open end, a spring pressed pressure plate keyed in the drum for movement toward and away from the stationary plate and held and urged accordingly by the springs thereof to normal position away from the stationary plate, friction lining between the plates, fixed screw means mounted in the drum, a thrust bearing including a disk shaped body threaded on the screw means, an annular flange formed on and extending axially of the periphery of the body, a ring slidably mounted within the flange in face to face relation to the body, said body and ring having grooves in the confronting faces thereof to provide a raceway, anti-friction balls in the raceway, a collar fixed within the drum, a shaft having its end portions rockably mounted in the collar and stationary plate respectively and extending through the latter for connection of brake operating means thereto, a fork fixed to the inner end of the shaft, a pin adjustably associated with the body and extending between the arms of the fork to be acted upon by the latter for threading the body on the screw means for urging the ring against the pressure plate to move the latter to operative position.

JAMES E. SYMONS.
JESSE W. SYMONS.